United States Patent [19]

Butler

[11] Patent Number: 4,535,197

[45] Date of Patent: Aug. 13, 1985

[54] UNITARY CABLE CLOSURE

[76] Inventor: David O. Butler, 1306 Vermont Ave., Tarpon Springs, Fla. 33589

[21] Appl. No.: 597,673

[22] Filed: Apr. 6, 1984

[51] Int. Cl.$^3$ .................. H02G 15/113; H02G 15/18; H02G 7/08

[52] U.S. Cl. ...................................... 174/41; 24/587; 24/704; 138/166; 138/168; 174/92

[58] Field of Search .................... 174/41, 68 C, 70 A, 174/92, DIG. 11; 24/543, 575, 576, 578, 587, 704; 138/107, 128, 162, 166, 168; 248/61

[56] References Cited

U.S. PATENT DOCUMENTS

| | | | |
|---|---|---|---|
| 2,558,367 | 6/1951 | Madsen | 24/576 |
| 2,683,304 | 7/1954 | Channell | 174/41 X |
| 3,517,702 | 6/1970 | Mueller et al. | 138/168 X |
| 3,715,459 | 2/1973 | Hoffman | 174/92 X |
| 3,836,696 | 9/1974 | Gressitt et al. | 174/41 |
| 4,015,072 | 3/1977 | Gillemot | 174/92 |
| 4,128,918 | 12/1978 | Wenk | 24/543 X |
| 4,486,620 | 12/1984 | Ball et al. | 174/41 |

FOREIGN PATENT DOCUMENTS

| | | | |
|---|---|---|---|
| 225770 | 2/1963 | Austria | 174/92 |
| 984179 | 2/1965 | United Kingdom | 174/92 |

Primary Examiner—Laramie E. Askin
Attorney, Agent, or Firm—Stanley M. Miller

[57] ABSTRACT

A unitary cable closure is disclosed, for enclosing a communications cable suspended from a support strand. The closure includes a tubular housing having a pair of mating edges separated by an access slot, the edges being manually fastened together in mating engagement after passing the cable through the slot. The closure further includes a rib integrally formed in the wall of the tubular housing. The closure also includes a termination port in the side of the tubular housing. The terminal port includes a rectangular frame and lid. The closure also includes a metal hanger bracket having a lower, horizontal portion fastened to the inside upper surface of the tubular housing at the rib and a vertical portion projecting upwardly through the upper surface of the rib of the tubular housing, for fastening to the support strand. In one embodiment, the tubular housing includes a first edge of the pair including a first hook projecting from the wall and having an upwardly projecting barb, an upper guard projecting from the wall and extending above the barb of the hook, and a first lower guard projecting from the wall and extending below the hook. A second edge of the pair includes a second hook projecting from the wall and has a downwardly projecting barb and a second lower guard projecting from the wall and extending below the second hook. The first and second hooks are thereby protected by both the first and second lower guards when the two edges are joined.

28 Claims, 12 Drawing Figures

UNITARY CABLE CLOSURE

FIELD OF THE INVENTION

The invention disclosed broadly relates to cable apparatus and more particularly relates to improvements in cable enclosures.

BACKGROUND OF THE INVENTION

The telephone industry employs a variety of terminals, splice enclosures and splice cases for enclosing the mating ends of different cables suspended from an aerial strand. Usually, such prior art enclosures require the use of special tools or adhesives to seal them after inserting the cable splice. Such prior art splice cases and enclosures often fail to maintain a reliable barrier against rain water, insects, and ultra-violet light which can deteriorate the insulating characteristics of the wrappings of the cables contained therein. Another problem associated with the prior art splice cases and enclosures is the necessity to maintain them secure against unauthorized entry. Conventional enclosures are too easy to gain unauthorized entry into. Examples of such prior art enclosures are found in U.S. Pat. Nos. 3,846,575; 3,517,702 and 2,198,415 and also in British Pat. No. 984,179. Other prior art showing related structures which also fail to solve the above stated problems include U.S. Pat. Nos. 4,391,303; 4,372,011; 4,073,090; 3,654,049; 3,529,795; 3,226,787 and 2,023,433.

OBJECTS OF THE INVENTION

It is therefore an object of the invention to provide an improved enclosure for the encapsulation of cable splices.

It is a further object of the invention to provide an improved enclosure for the encapsulation of cable splices which is easier to seal than has been available in the prior art.

It is still a further object of the invention to provide an improved enclosure for the encapsulation of cable splices which is more impervious to rain water, ultra-violet light and insects than has been available in the prior art.

It is yet a further object of the invention to provide an inproved enclosure for the encapsulation of cable splices which is more secure against unauthorized entry than has been available in the prior art.

SUMMARY OF THE INVENTION

These and other objects, features and advantages of the invention are accomplished by the unitary cable closure invention disclosed herein. A unitary cable closure is disclosed, for enclosing a communications cable suspended from a support strand. The closure includes a hollow, flexible wall, tubular housing having a pair of longitudinal mating edges separated by a longitudinal access slot, the edges being manually fastened together in mating engagement after passing the cable through the slot. The closure further includes a circumferential rib portion integrally formed in the wall of the tubular housing. The closure also includes a metal hanger bracket having a lower, substantially horizontal portion fastened to the inside upper surface of the tubular housing at the rib portion and a vertical portion projecting upwardly through the upper surface of the rib portion of the tubular housing, for fastening to the support strand. In this manner, the closure can be manually fastened about the cable. In one embodiment, the tubular housing includes a first longitudinal edge of the pair including a first hook portion projecting circumferentially from the wall and having an upwardly projecting barb, an upper guard portion projecting from the wall and extending above the barb of the hook portion, and a first lower guard portion projecting from the wall and extending below the hook portion. A second longitudinal edge of the pair includes a second hook portion projecting circumferentially from the wall and having a downwardly projecting barb and a second lower guard portion projecting from the wall and extending below the second hook portion. The second hook portion of the second edge is disposed for mating engagement between the upper guard and the first hook portion of the first edge, and the second lower guard portion of the second edge is disposed for engagement between the first hook portion and the first lower guard portion of the first edge. In this manner, the first and second hook portions are protected by both the first and the second lower guard portions. The resultant unitary cable closure invention provides an improved enclosure for the encapsulation of cable splices which is easier to seal than has been available in the prior art. The invention is more impervious to rain water, ultra-violet light and insects than has been available in the prior art. In addition, the invention is more secure against unauthorized entry than has been available in the prior art.

DESCRIPTION OF THE FIGURES

These and other objects, features and advantages of the invention will be more fully appreciated with reference to the accompanying figures.

DISCUSSION OF THE PREFERRED EMBODIMENTS

Figure 1:
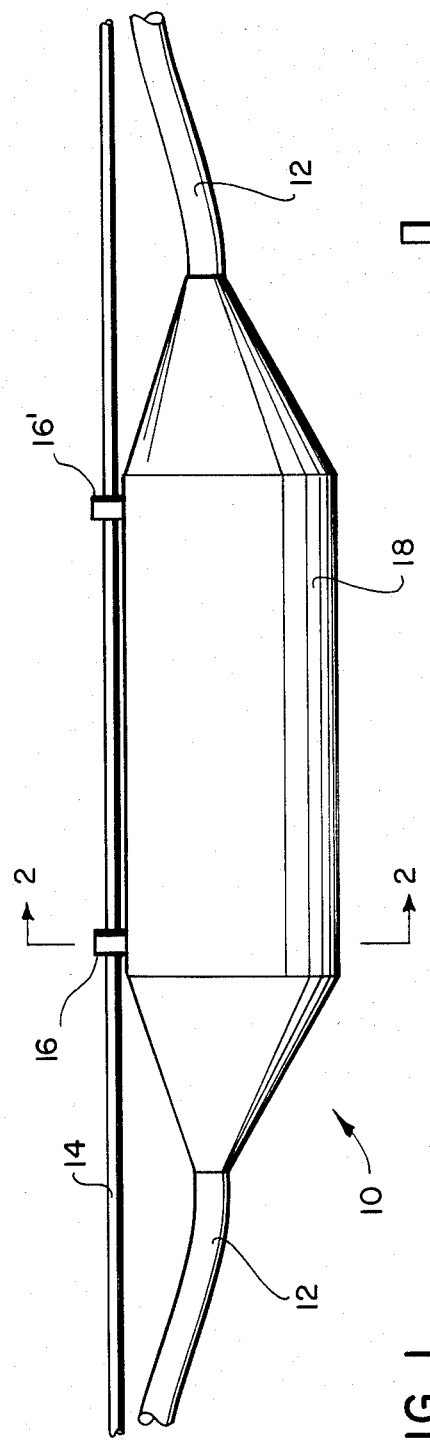
FIG. 1 is a side view of the unitary cable closure invention.
Figure 2:
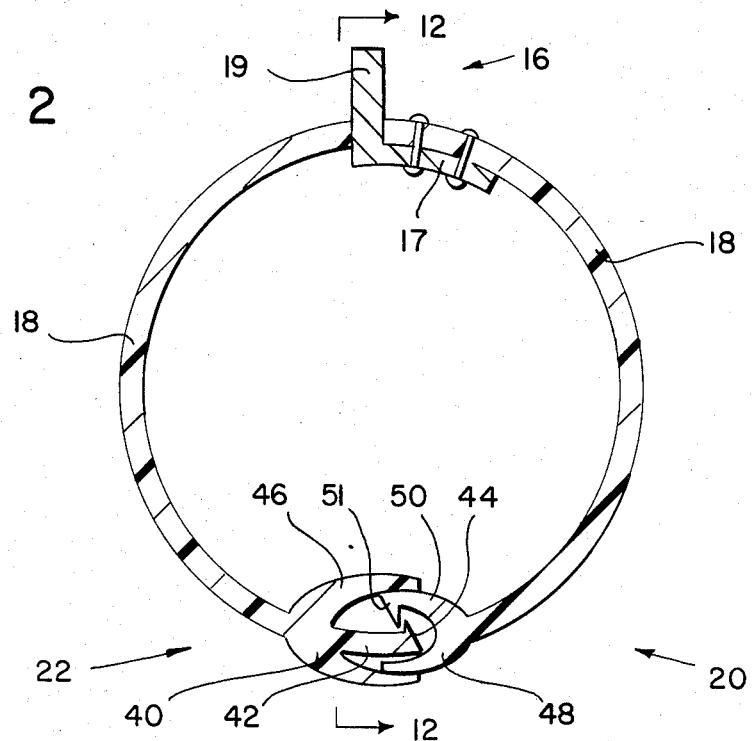
FIG. 2 is a cross sectional view along the section line 2—2 of FIG. 1, showing the first embodiment of the closure as a hooked snap lock, in its closed state.

A unitary cable closure 10 is shown in FIG. 1, for enclosing a communications cable 12 suspended from a support strand 14. The closure 10 includes a hollow, flexible wall, tubular housing 18 shown to better advantage in FIGS. 2 and 3, having a pair of longitudinal mating edges 20 and 22 separated by a longitudinal access slot. The edges 20 and 22 can be fastened together in mating engagement after passing the cable 12 through the slot. The edges 20 and 22 extend along the entire length of the bottom of the housing 18, as seen for edge 20 in FIG. 12.

Figure 12:
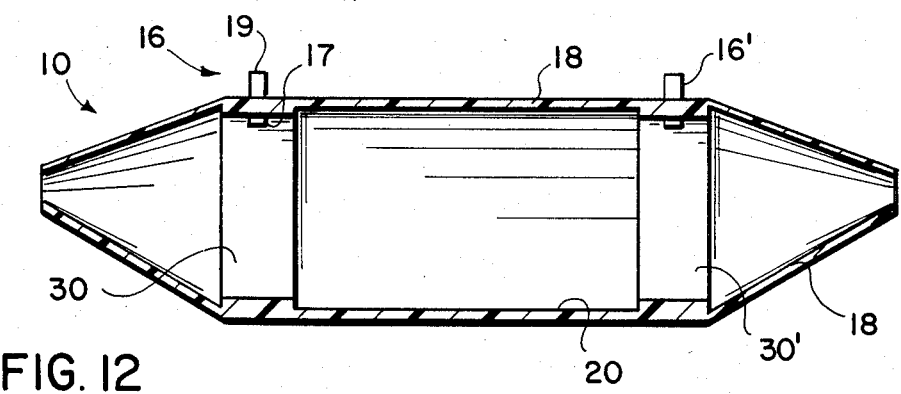
FIG. 12 is a cross sectional view along the section line 12—12 of FIG. 2.

The closure 10 further includes a circumferential rib portion 30 shown in FIG. 12, which is integrally formed in the wall of the tubular housing 18. A metal hanger bracket 16 has a lower, substantially horizontal portion 17 shown in FIG. 2, fastened to the inside upper surface of the tubular housing 18 at the rib portion 30 and a vertical portion 19 projecting upwardly through the upper surface of the rib portion 30 of the tubular housing 18, for fastening to the support strand 14. The tubular housing 18 can be approximately 0.125 inch thick and can be formed from a flexible plastic. The rib portion 30 can be integrally formed with the tubular housing 18, as a thicker portion having a thickness typically of approximately 0.250 inch. The thicker rib portion contributes to the structural strength of the tubular housing without significantly detracting from the flexibility thereof. It is the flexibility of the tubular housing 18 which enables the easy manual closure thereof around a cable 12 which is suspended from an aerial strand 14.

Figure 3:
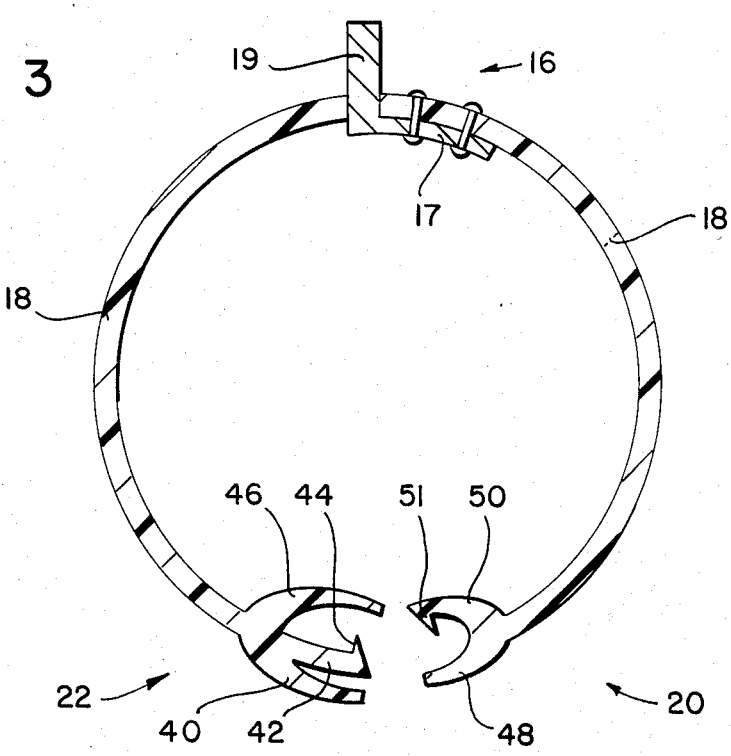
FIG. 3 is a view similar to that in FIG. 2, showing the first embodiment of the closure in its open state.

The first embodiment of the invention is shown in FIG. 3, which provides an impervious, tamper-resistant seal for the tubular housing 18. The tubular housing 18 includes the hooked permanent snap lock in which the first longitudinal edge 22 of the pair includes a first hook portion 42 projecting circumferentially from the wall 18 and having an upwardly projecting barb 44. An upper guard portion 46 projects from the wall 18 and extends above the barb 44 of the hook portion 42. A first lower guard portion 40 projects from the wall 18 and extends below the hook portion 42.

The second longitudinal edge 20 of the pair includes a second hook portion 50 projecting circumferentially from the wall 18 having a downwardly projecting barb 51 and a second lower guard portion 48 projecting from the wall 18 and extending below the second hook portion 50.

The second hook portion 50 of the second edge 20 is disposed for mating engagement between the upper guard portion 46 and the first hook portion 42 of the first edge 22, and the second lower guard portion 48 of the second edge 20 is disposed for mating engagement between the first hook portion 42 and the first lower guard portion 40 of the first edge 22.

In this manner, the first and second hook portions 42 and 50 are protected by both the first and the second lower guard portions 40 and 48, respectively.

As can be seen in FIG. 12, a second circumferential rib portion 30' be integrally formed in the wall of the tubular housing 18.

FIG. 12 also shows a second metal hanger bracket 16' having a lower, substantially horizontal portion 17 fastened to the inside upper surface of the tubular housing 18 at the second rib portion 30' and a vertical portion 19 projecting upwardly through the upper surface of the second rib portion 30' of the tubular housing 18, for fastening to the strand 14. The metal hanger bracket may be fastened to the strand by any of several means well known in the prior art.

Figure 4:
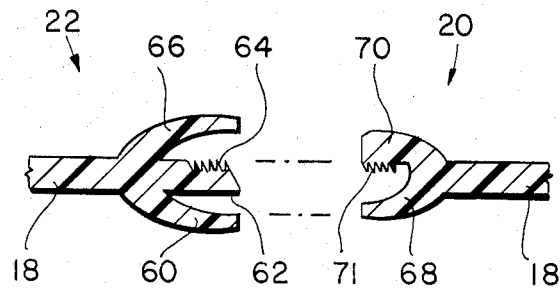
FIG. 4 is a view similar to that in FIG. 3, showing the second embodiment of the closure as a saw tooth snap lock.

The second embodiment of the invention, which features the saw tooth permanent snap hook, is shown in FIG. 4. This embodiment provides another impervious, tamperproof seal for the tubular housing. The first longitudinal edge 22 of the pair includes a first saw tooth portion 62 projecting circumferentially from the wall 18 and having an upwardly projecting serrated surface 64, an upper guard portion 66 projecting from the wall 18 and extending above the serrated surface 64 of the saw tooth portion 62, and a first lower guard portion 60 projecting from the wall 18 and extending below the saw tooth portion 62.

FIG. 4 shows the second longitudinal edge 20 of the pair including a second saw tooth portion 70 projecting circumferentially from the wall 18 and having a downwardly projecting serrated surface 71 and a second lower guard portion 68 projecting from the wall 18 and extending below the second saw tooth portion 70.

The second saw tooth portion 70 of the second edge 20 is disposed for mating engagement between the upper guard 66 and the first saw tooth portion 62 of the first edge 22 and the second lower guard portion 68 of the second edge 20 is disposed for mating engagement between the first saw tooth portion 62 and the first lower guard portion 60 of the first edge 22.

In this manner, the first and second saw tooth portions 62 and 70 are protected by both the first and the second lower guard portions 60 and 68, respectively.

The tubular housing 18 can be composed of a moldable, flexible plastic selected from the group consisting of acrylonitrile butadiene styrene, polyvinyl chloride, polyethylene, polypropylene, polytetrafluoroethylene, and polysilicone rubber. The bracket 16 can be composed of stainless steel.

Figure 5:
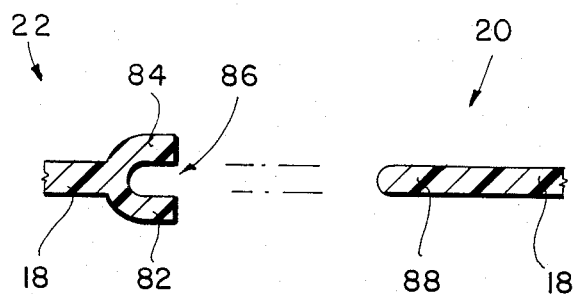
FIG. 5 is a view similar to that in FIG. 3, showing the third embodiment of the closure as a tongue and groove joint.

FIG. 5 shows the tongue and groove feature of the third embodiment of the invention. This embodiment provides for the relatively easy re-entry into the tubular housing 18 after it has been closed. The first longitudinal edge 22 of the pair includes a first groove portion 86 between tines 82 and 84, projecting circumferentially from the wall 18.

The second longitudinal edge 20 of the pair includes a tongue portion 88 projecting circumferentially from the wall 18.

The tongue portion 88 of the second edge 20 is disposed for mating engagement with the groove portion 86 of the first edge 22.

Figure 6:
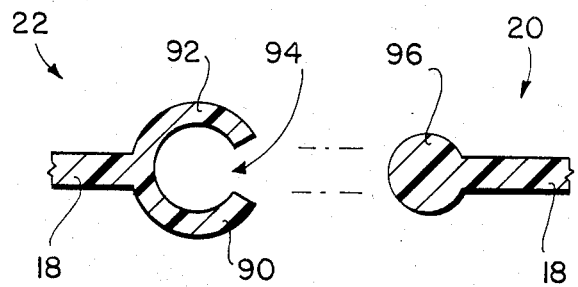
FIG. 6 is a view similar to that in FIG. 3, showing the fourth embodiment of the closure as a ball joint.

FIG. 6 shows the ball joint feature of the fourth embodiment of the invention. This embodiment provides for the relatively easy re-entry into the tubular housing 18 after it has been closed. The first longitudinal edge 22 of the pair includes a groove portion 94 between the tines 90 and 92, having a longitudinally cylindrical hollow shape.

The second longitudinal edge 20 of the pair includes a longitudinal, circularly cylindrical portion 96 projecting circumferentially from the wall 18.

The circularly cylindrical portion 96 of the second edge 20 is disposed for mating engagement with the groove portion 94 of the first edge 22.

Figure 7:
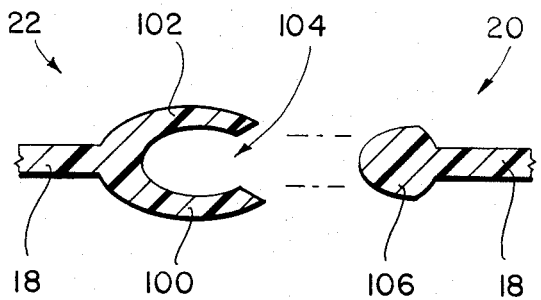
FIG. 7 is a view similar to that in FIG. 3, showing the fifth embodiment of the closure as a modified ball joint.
Figure 8:
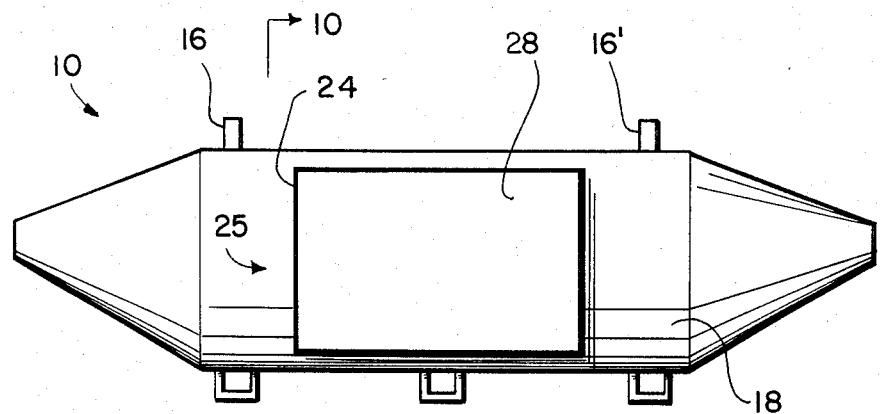
FIG. 8 is a side view of the unitary cable closure with a terminal lid in the closed position.

FIG. 7 shows a fifth embodiment of the invention which features the modified ball joint structure. This embodiment provides for the relatively easy re-entry into the tubular housing 18 after it has been closed. The first longitudinal edge 22 of the pair includes a groove portion 104 between the tines 100 and 102, having a longitudinally cylindrical hollow shape.

The second longitudinal edge 20 of the pair includes a longitudinal, spade-shaped portion 106 projecting circumferentially from the wall 18.

The spade-shaped portion 106 of the second edge is disposed for mating engagement with the groove portion 104 of the first edge 22.

In typical applications in the communications industry, the tubular housing can have a diameter of approximately two to five inches and can have a length of approximately twenty to thirty inches. Since the cable 12 must be drawn away from the supporting strand 14 in order to enter the end of the tubular housing 10, as shown in FIG. 1, it has been found that the resultant transverse force applied to the cable 12 can be minimized by offsetting the position of the cable entrance into the end of the housing 10, making it closer to the supporting strand 14 by a distance of approximately 0.5 inch, for example.

When it is desired to bring some of the wires in the cable 12 out of the tubular housing 18 for local termination, the termination port 25 can be formed in the side of the tubular housing 18, as is shown in FIGS. 8 through 11. The termination port 25 includes a rectangular frame 24 formed about a rectangular opening in one side of the tubular housing 18 between the first and the second ribs 30 and 30'. A hinge 29 is integrally mounted horizontally on a top side of the frame 24. A rectangular lid 28 is pivotally mounted on the hinge 29, for providing access to the interior of the tubular housing 18. In this manner, the closure can be manually fastened about the cable and access can be had to terminate portions of the cable through the rectangular opening.

The frame 24 is integrally formed with the tubular housing, for forming a water tight seal therewith. The tubular housing and rectangular frame are composed of a moldable, flexible plastic selected from the group consisting of acrylonitrile butadiene styrene, polyvinyl chloride, polyethylene, polypropylene, polytetrafluoroethylene, and polysilicone rubber.

Figure 11:
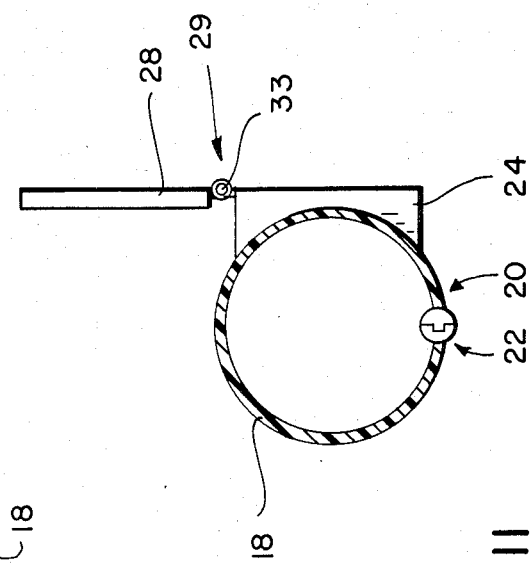
FIG. 11 is a cross sectional view along section line 11—11 of FIG. 9.
Figure 10:
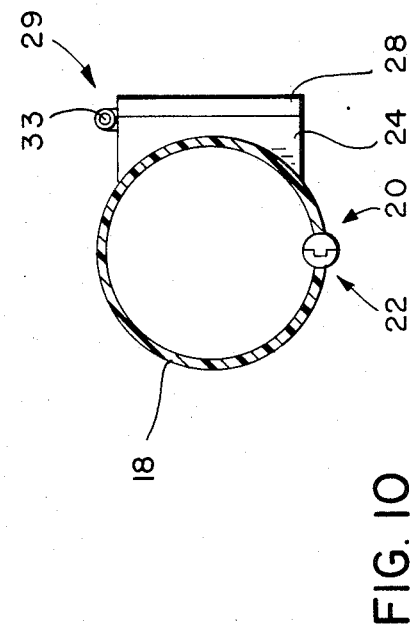
FIG. 10 is a cross sectional view along section line 10—10 of FIG. 8.

The lid 28 is mounted on the top of the frame 24 as is seen in FIG. 11, so that it opens outwardly to rest in a vertical, upward orientation on the top of the frame. In this manner, wind force or vibration can close the lid if it is otherwise left unattended.

Figure 9:
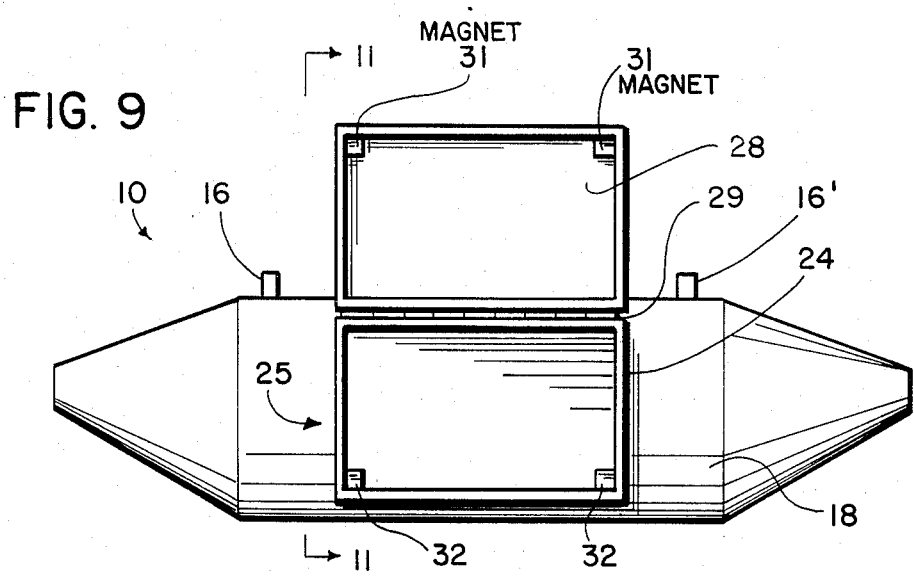
FIG. 9 is a side view of the unitary cable closure of FIG. 8, with the terminal lid in the open position.

As shown in FIG. 9, a magnetic latch composed of magnets 31 mounted on lid 28 and magnetic pieces 32 mounted on the rectangular frame 34 is provided for securing the lid to the frame, when closed.

The lid 28 is mounted to the rectangular frame 24 by means of a stainless steel pin 33, which is mounted in the hinge 29, about which the lid pivots, as is shown in FIG. 11. The hinge 29 is integrally formed with the rectangular frame 24, for forming a unitary structure therewith.

The resultant unitary cable closure invention provides an improved enclosure for the encapsulation of cable splices which is easier to seal than has been available in the prior art. The invention is more impervious to rain water, ultra-violet light and insects than has been available in the prior art. In addition, the invention is more secure against unauthorized entry than has been available in the prior art.

Although specific embodiments of the invention have been disclosed, it will be understood by workers having skill in the art that minor changes can be made to the structure and composition of the invention as disclosed, without departing from the spirit and the scope of the invention.

What is claimed is:

1. A unitary cable closure for enclosing a communications cable suspended from a support strand, comprising:

a hollow, flexible wall, tubular housing having a pair of longitudinal mating edges separated by a longitudinal access slot, said edges being manually fastenable together in mating engagement after passing a cable through said slot;

a circumferential rib portion integrally formed in said wall of said tubular housing;

a metal hanger bracket having a lower, substantially horizontal portion fastened to the inside upper surface of said tubular housing at said rib portion and a vertical portion projecting upwardly through said upper surface of said rib portion of said tubular housing, for fastening to a support strand;

whereby said closure can be manually fastened about a cable.

2. The apparatus of claim 1, wherein said tubular housing further comprises:

a first longitudinal edge of said pair including a first hook portion projecting circumferentially from said wall and having an upwardly projecting barb, an upper guard portion projecting from said wall and extending above said barb of said hook portion, and a first lower guard portion projecting from said wall and extending below said hook portion;

a second longitudinal edge of said pair including a second hook portion projecting circumferentially from said wall and having a downwardly projecting barb and a second lower guard portion projecting from said wall and extending below said second hook portion;

said second hook portion of said second edge disposed for mating engagement between said upper guard portion and said first hook portion of said first edge, and said second lower guard portion of said second edge disposed for mating engagement between said first hook portion and said first lower guard portion of said first edge;

whereby said first and second hook portions are protected by both said first and said second lower guard portions.

3. The apparatus of claim 1, which further comprises:

a second circumferential rib portion integrally formed in said wall of said tubular housing;

a second metal hanger bracket having a lower, substantially horizontal portion fastened to the inside upper surface of said tubular housing at said second rib portion and a vertical portion projecting upwardly through said upper surface of said second rib portion of said tubular housing, for fastening to a strand.

4. The apparatus of claim 1, wherein said tubular housing further comprises:

a first longitudinal edge of said pair including a first saw tooth portion projecting circumferentially from said wall and having an upwardly projecting serrated surface, an upper guard portion projecting from said wall and extending above said serrated surface of said saw tooth portion, and a first lower guard portion projecting from said wall and extending below said saw tooth portion;

a second longitudinal edge of said pair including a second saw tooth portion projecting circumferentially from said wall and having a downwardly projecting serrated surface and a second lower guard portion projecting from said wall and extending below said second saw tooth portion;

said second saw tooth portion of said second edge disposed for mating engagement between said upper guard portion and said first saw tooth portion of said first edge, and said second lower guard portion of said second edge disposed for mating engagement between said first saw tooth portion and said first lower guard portion of said first edge; whereby said first and second saw tooth portions are protected by both said first and said second lower guard portions.

5. The apparatus of claim 1, wherein said tubular housing is composed of a moldable, flexible plastic selected from the group consisting of acrylonitrile butadiene styrene, polyvinyl chloride, polyethylene, polypropylene, polytetrafluoroethylene, and polysilicone rubber.

6. The apparatus of claim 1, wherein said bracket is composed of stainless steel.

7. The apparatus of claim 1, wherein said tubular housing rther comprises:
- a first longitudinal edge of said pair including a first groove portion projecting circumferentially from said wall;
- a second longitudinal edge of said pair including a tongue portion projecting circumferentially from said wall;
- said tongue portion of said second edge disposed for mating engagement with said groove portion of said first edge.

8. The apparatus of claim 1, wherein said tubular housing further comprises:
- a first longitudinal edge of said pair including a groove portion having a longitudinally cylindrical hollow shape;
- a second longitudinal edge of said pair including a longitudinal, circularly cylindrical portion projecting circumferentially from said wall;
- said circularly cylindrical portion of said second edge disposed for mating engagement with said groove portion of said first edge.

9. The apparatus of claim 1, wherein said tubular housing further comprises:
- a first longitudinal edge of said pair including a groove portion having a longitudinally cylindrical hollow shape;
- a second longitudinal edge of said pair including a longitudinal, spade-shaped portion projecting circumferentially from said wall;
- said spade-shaped portion of said second edge disposed for mating engagement with said groove portion of said first edge.

10. The apparatus of claim 1, wherein said tubular housing further comprises:
- a first longitudinal edge of said pair including a first hook portion projecting circumferentially from said wall and having an upwardly projecting barb, an upper guard portion projecting from said wall and extending above said barb of said hook portion, and a first lower guard portion projecting from said wall and
extending below said hook portion;
- a second longitudinal edge of said pair including a second hook portion projecting circumferentially from said wall and having a downwardly projecting barb and a second lower guard portion ojecting from said wall and extending below said second hook portion;
- said second hook portion of said second edge disposed for mating engagement between said upper guard portion and said first hook portion of said first edge, and said second lower guard portion of said second edge disposed for. mating engagement between said first hook portion and said first lower guard portion of said first edge;
- a second circumferential rib portion integrally formed in said wall of said tubular housing;
- a second metal hanger bracket having a lower, substantially horizontal portion fastened to the inside upper surface of said tubular housing at said second rib portion and a vertical portion projecting upwardly through said upper surface of said second rib portion of said tubular housing, for fastening to a strand;
- said tubular housing being composed of a moldable, flexible plastic selected from the group consisting of acrylonitrile butadiene styrene, polyvinyl chloride, polyethylene, polypropylene, polytetrafluoroethylene, and polysilicone rubber: and
- said brackets being composed of stainless steel.

11. The apparatus of claim 1, wherein said tubular housing further comprises:
- a first longitudinal edge of said pair including a first saw tooth portion projecting circumferentially from said wall and having an upwardly projecting serrated surface, an upper guard portion projecting from said wall and extending above said serrated surface of said saw tooth portion, and a first lower guard potion projecting from said wall and extending below said saw toth portion;
- a second longitudinal edge of said pair including a second saw tooth portion projecting circumferentially from said wall and having a downwardly projecting serrated surface and a second lower guard portion projecting from said wall and extending below said second saw tooth portion;
- said second saw tooth portion of said second edge disposed for mating engagement between said upper guard portion and said first saw tooth portion of said first edge, and said second lower guard portion of said second edge disposed for mating engagement between said first saw tooth portion and said first lower guard portion of said first edge;
- a second circumferential rib portion integrally formed in said wall of said tubular housing;
- a second metal hanger bracket having a lower, substantially horizontal portion fastened to the inside upper surface of said tubular housing at said second rib portion and a vertical portion projecting upwardly through said upper surface of said second rib portion of said tubular housing, for fastening to a strand;
- said tubular housing being composed of a moldable, flexible plastic selected from the group consisting of acrylonitrile butadiene styrene, polyvinyl chloride, polyethylene, polypropylene, polytetrafluoroethylene, and polysilicone rubber; and
- said brackets being composed of stainless steel.

12. The apparatus of claim 1, wherein said tubular housing further comprises:
- a first longitudinal edge of said pair including a first groove portion projecting circumferentially from said wall;
- a second longitudinal edge of said pair including a tongue portion projecting circumferentially from said wall;
- said tongue portion of said second edge disposed for mating engagement with said groove portion of said first edge;

a second circumferential rib portion integrally formed in said wall of said tubular housing;

a second metal hanger bracket having a lower, substantially horizontal portion fastened to the inside upper surface of said tubular housing at said second rib portion and a vertical portion projecting upwardly through said upper surface of said second rib portion of said tubular housing, for fastening to a strand;

said tubular housing being composed of a moldable, flexible plastic selected from the group consisting of acrylonitrile butadiene styrene, polyvinyl chloride, polyethylene, polypropylene, polytetrafluoroethylene, and polysilicone rubber; and said brackets being composed of stainless steel.

13. The apparatus of claim 1, wherein said tubular housing further comprises:

a first longitudinal edge of said pair including a groove portion having a longitudinally cylindrical hollow shape;

a second longitudinal edge of said pair including a longitudinal, circularly cylindrical portion projecting circumferentially from said wall;

said circularly cylindrical portion of said second edge disposed for mating engagement with said groove portion of said first edge;

a second circumferential rib portion integrally formed in said wall of said tubular housing;

a second metal hanger bracket having a lower, substantially horizontal portion fastened to the inside upper surface of said tubular housing at said second rib portion and a vertical portion projecting upwardly through said upper surface of said second rib portion of said tubular housing, for fastening to a strand;

said tubular housing being composed of a moldable, flexible plastic selected from the group consisting of acrylonitrile butadiene styrene, polyvinyl chloride, polyethylene, polypropylene, polytetrafluoroethylene, and polysilicone rubber; and said brackets being composed of stainless steel.

14. The apparatus of claim 1, wherein said tubular housing further comprises:

a first longitudinal edge of said pair including a groove portion having a longitudinally cylindrical hollow shape;

a second longitudinal edge of said pair including a longitudinal, spade-shaped portion projecting circumferentially from said wall;

said spade-shaped portion of said second edge disposed for mating engagement with said groove portion of said first edge;

a second circumferential rib portion integrally formed in said wall of said tubular housing;

a second metal hanger bracket having a lower, substantially horizontal portion fastened to the inside upper surface of said tubular housing at said second rib portion and a vertical portion projecting upwardly through said upper surface of said second rib portion of said tubular housing, for fastening to a strand;

said tubular housing being composed of a moldable, flexible plastic selected from the group consisting of acrylonitrile butadiene styrene, polyvinyl chloride, polyethylene, polypropylene, polytetrafluoroethylene, and polysilicone rubber; and said brackets being of stainless steel.

15. A unitary cable closure for enclosing a communications cable suspended from a support strand, comprising:

a hollow, flexible wall, tubular housing having a pair of longitudinal mating edges separated by a longitudinal access slot, said edges being manually fastenable together in mating engagement after passing a cable through said slot;

a first circumferential rib portion integrally formed in said wall of said tubular housing;

a metal hanger bracket having a lower, substantially horizontal portion fastened to the inside upper surface of said tubular housing at said first rib portion and a vertical portion projecting upwardly through said upper surface of said first rib portion of said tubular housing, for fastening to a support strand;

a second circumferential rib portion integrally formed in said wall of said tubular housing;

a second metal hanger bracket having a lower, substantially horizontal portion fastened to the inside upper surface of said tubular housing at said second rib portion and a vertical portion projecting upwardly through said upper surface of said second rib portion of said tubular housing, for fastening to a strand;

a rectangular frame formed about a rectangular opening in one side of said tubular housing between said first and said second rib portions;

a hinge mounted horizontally on a top side of said frame;

a rectangular lid pivotally mounted on said hinge, for providing access to the interior of said tubular housing;

whereby said closure can be manually fastened about a cable and access can be had to terminate portions of a cable through said rectangular opening.

16. The apparatus of claim 15, wherein said frame is integrally formed with said tubular housing, for forming a water tight seal therewith.

17. The apparatus of claim 16, wherein said tubular housing and rectangular frame are composed of a moldable, flexible plastic selected from the group consisting of acrylonitrile butadiene strene, polyvinyl chloride, polyethylene, polypropylene, polytetrafluoroethylene, and polysilicone rubber.

18. The apparatus of claim 17, wherein said hinge is integrally formed with said rectangular frame, for forming a unitary structure therewith.

19. The apparatus of claim 15, wherein said lid opens outwardly to rest in a vertical, upward orientation on the top of said frame;

whereby wind force or vibration can close said lid if otherwise left unattended.

20. The apparatus of claim 19, which further comprises:

a magnetic latch mounted on said lid and rectangular frame for securing said lid to said rectangular frame when closed.

21. The apparatus of claim 19, wherein said lid is mounted to said rectangular frame by means of a stainless steel pin mounted in said hinge, about which said lid pivots.

22. A unitary cable closure for enclosing a communications cable suspended from a support strand, comprising:

a hollow, flexible wall, tubular housing having a pair of longitudinal mating edges separated by a longitudinal access slot, said edges being manually fastenable together in mating engagement after passing a cable through said slot;

an attachment means having a lower portion fastened to said tubular housing and an upper portion projecting upwardly from said tubular housing, for fastening to a support strand;

a rectangular frame formed about a rectangular opening in one side of said tubular housing;

a hinge mounted horizontally on a top side of said frame;

a rectangular lid pivotally mounted on said hinge, for providing access to the interior of said tubular housing;

whereby said closure can be manually fastened about a cable and access can be had to terminate portions of a cable through said rectangular opening.

23. The apparatus of claim 22, wherein said frame is integrally formed with said tubular housing, for forming a water tight seal therewith.

24. The apparatus of claim 23, wherein said tubular housing and rectangular frame are composed of a moldable, flexible plastic selected from the group consisting of acrylonitrile butadiene styrene, polyvinyl chloride, polyethylene, polypropylene, polytetrafluoroethylene, and polysilicone rubber.

25. The apparatus of claim 24, wherein said hinge is integrally formed with said rectangular frame, for forming a unitary structure therewith.

26. The apparatus of claim 22, wherein said lid opens outwardly to rest in a vertical, upward orientation on the top of said frame;

whereby wind force or vibration can close said lid if otherwise left unattended.

27. The apparatus of claim 26, which further comprises:

a magnetic latch mounted on said lid and rectangular frame for securing said lid to said rectangular frame when closed.

28. The apparatus of claim 26, wherein said said lid is mounted to said rectangular frame by means of a stainless steel pin mounted in said hinge, about which said lid pivots.

* * * * *